Jan. 8, 1935.  D. C. WENDEL  1,986,953
TAILBOARD MOUNTING
Filed April 16, 1930   2 Sheets-Sheet 1
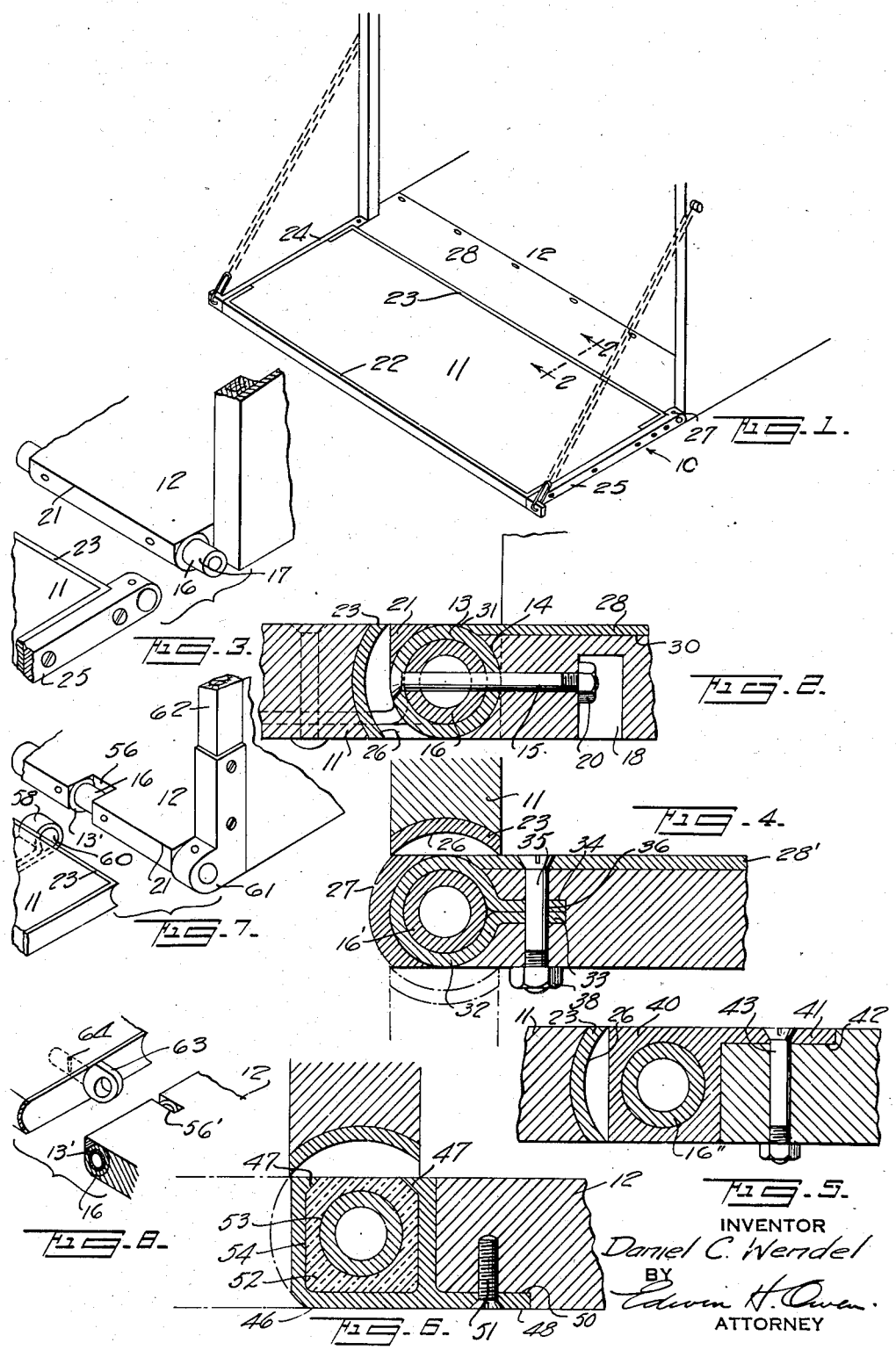
INVENTOR
Daniel C. Wendel
BY
Edwin H. Owen
ATTORNEY

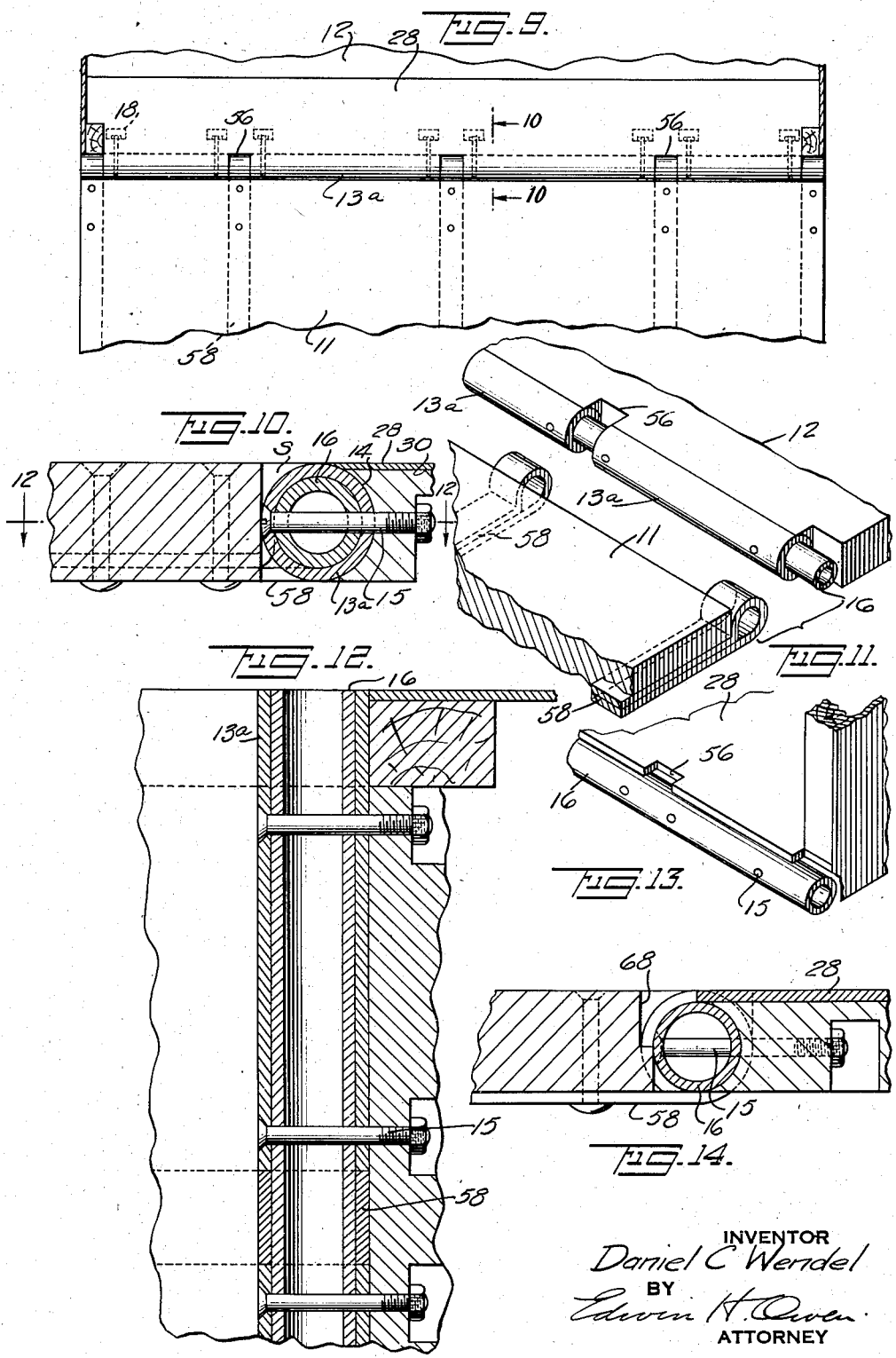

Patented Jan. 8, 1935

1,986,953

UNITED STATES PATENT OFFICE 1,986,953

TAILBOARD MOUNTING

Daniel C. Wendel, Newark, N. J.

Application April 16, 1930, Serial No. 444,773

10 Claims. (Cl. 296—57)

My invention relates to tail board mountings for truck bodies particularly the type which reduces to a minimum the space left between the tail board and truck floor ends when the tail board is opened to a horizontal position.

One object is to provide a continuous, smooth surface from the floor, to and across the tail board of the truck or van for example of the type used to move furniture, pianos and the like, having casters secured to the bottom thereof. The furniture is usually rolled off from the floor of the truck and always has to be lifted slightly when the casters pass over the space between the tail board and floor ends. If this is not done, the result is a damaged piece of furniture, due to the sudden shock when the casters engage said space and become jammed.

Another object is to provide a structure which will consist mainly of standard parts such as pipe or tubing, which are easily assembled and cost very little.

Another object is to provide a structure which will be very rigid and not be easily damaged.

In the following drawings various forms of my invention are illustrated, in which Figure 1 is a perspective view of a portion of the rear end of a truck body with a flush type tail board mounted and lowered to a horizontal position.

Fig. 2 is a cross section taken on the line 2—2 of Fig. 1;

Fig. 3 is a perspective detail showing a portion of the tail board and truck rear end, detached;

Fig. 4 is a view similar to Fig. 2 showing another form of tubing, and securing means;

Fig. 5 is a cross-sectional view of a modified form in which a square bar with a projecting flange is used in place of the tube;

Fig. 6 is a view similar to Fig. 5 in which a channel with a projecting flange is used in place of the square bar, with a cored square bar of rubber placed within said channel;

Fig. 7 is a perspective detail view of a mounting similar to Fig. 1, but having intermediate reinforcing straps which engage the core at a plurality of points, the floor being cut out to accommodate said straps;

Fig. 8 is a detail in perspective of another reinforcing means;

Fig. 9 is a plan view of another form of tail board mounting which has a small space between the floor and tail board ends;

Fig. 10 is a sectional view taken on the lines 10—10 of Fig. 9;

Fig. 11 is a detached detail perspective of the form shown in Figs. 9 and 10;

Fig. 12 is a sectional view taken on the lines 12—12 of Fig. 10;

Fig. 13 is a detail perspective of a simple form using one pipe;

Fig. 14 is a cross-section of the form shown in Fig. 13 with tail board attached;

In Fig. 1, I have shown a flush type of tail board mounting 10 in which there is no space between the ends of the tail board 11 and truck body floor 12. The surfaces of the tail board 11 and truck floor 12 are in perfect alignment as seen more clearly in Fig. 2.

The mounting is constructed in the following manner:

A pipe 13 is embedded in a recess 14 formed in the rear end of the flooring 12 and is held secure by means of bolts 15 passing through the pipe 13 and a core 16 inserted within pipe 13, the end of said bolts 15 terminating in slots 18 provided in the bottom surface of the floor 12 and held in place by nuts 20. To the upper end of the pipe is welded a right angled strip 21 having a curved inner face to engage the periphery of the pipe 13 which thus squares off the edge of the floor 12. The core 10 projects beyond the ends of the pipe as shown in Fig. 3 to form trunnions 17 on which the tail board is pivoted.

The tail board 11 is constructed of wood and reinforced by straps 22 and 23, also side bars 24 and 25, the inner ends 27 of which are formed to fit over trunnions 17. The strap 23 is arc shaped, the arc 26 formed to a radius equal to the distance from the corner of the strip 21 to the center of the core 16 plus a slight moving clearance. This is the important feature of the flush type mounting, since it leaves no space, other than the slight clearance to permit radial movement between the tail board and the floor ends when the tail board is lowered to the horizontal position shown in Fig. 2. The arc shaped strip 23 also forms a close fit between the end of the tail board and the floor 12 when the tail board is in closed or vertical position as indicated in Fig. 4.

A metal reinforcing plate 28 is embedded in a recess 30 of the floor 12, the end 31 abutting and fitting flush with the upper surface of the pipe 13 and may be secured in any convenient way.

In Fig. 4 I have shown a modified form in which the pipe 13 is replaced by a sleeve 32 having flanges 33 projecting outward therefrom and inserted in a slot 34 provided in the end of the floor 12. Bolts 35 are passed through holes in the floor 12 and engage holes 36 in the flanges 33. Nuts 38 are screwed on the ends of bolts 35 which project beyond the under surface of the floor. A core 16' is inserted within the sleeve 32 and a metal reinforcing plate 28' is embedded in the floor 12 like the plate 28. An arcuate strip 27 having an outside radius slightly less than the inside radius of the strap 23, is fitted over the exposed surface of the sleeve 32 with its upper surface flush with the surface of the plate 28' and is secured by welding. Due to the thickness of this strip 28 it protects the sleeve from any damage which might be caused by backing the truck into a platform for instance.

In Fig. 5 I have shown a simple form of mounting which consists of a substantially square shaped bar 40 having a flanged upper surface 41 adapted to fit in a recess 42 in the floor 12 and may be secured by bolts 43. A hole 44 may be either bored or cast in the bar 40 to receive a core 16'' or the bar may be left solid and have trunnions cast or turned on each end.

In Fig. 6 I have shown another form which consists of a substantially U-shaped member 46 with wedge shaped upper portions 47 and a projecting lower flange 48 adapted to fit in a recess 50 in the under surface of the floor 12, and is secured by bolts 51. A bar 52 of molded rubber or any like material, having a hole 53 centrally located within said bar inserted endwise in the cavity 54 of the member 48. The usual core 16''' is inserted in said hole to receive and to be pinned to the tail board mounting ends 27. This type of mounting has the advantage of preventing rattling as well as providing a flush type mounting.

For light delivery trucks, the mounting shown in Fig. 1 with two end bearings is sufficient but in trucks built for heavy service, additional bracing is required for the tail board mountings.

This bracing may be provided in many ways, two of which are shown in Figs. 7 and 8. A plurality of slots 56 and 56' are provided in the floor 12 with pipe sections 13' terminating at the faces of each slot. Strap iron hinges 58 secured to the tail board in any convenient way are looped at 60 to fit around the core 16 which is inserted in the pipe sections 13' and exposed in slots 56 and 56'. The ends of said core 16 terminate in brackets 61 secured to the end posts 62 of the truck body. Eye bolts 63, inserted in the end of the tail board 11 as shown in Fig. 8 and secured by means of locking pins 64 or nuts (not shown), are adapted to be inserted in the slots 56'. The core 16 is then passed through the pipe sections 13' and holes 65 in eye bolts 63 and the whole pipe mounting is secured by bolts 15 shown in Fig. 2. If desired the pipe sections 13 and core 16 may be replaced by a solid bar provided with turned grooves.

In Figs. 9 to 12, I have shown a modified structure of a simple and inexpensive form but which does not provide an absolute flush type of space less mounting. The space S which is left between the tail board end and floor end is however of such a form that no interference would be caused when furniture would pass over said space, the casters on said furniture being larger than the space.

The parts are identical to those referred to and shown in Figs. 2 and 7 with the exception that the strip 21 and arc shaped strap 23 are eliminated. It is obvious that this construction will be very inexpensive to manufacture since all standard parts are used namely short lengths of piping 13a for the supporting means, the core 16 which is also standard pipe and strap iron hinges 58, the whole being bolted into place by bolts 15. The only other operations are to provide the recesses 14 and 30 and the slots 18 and 56. The reinforcing plate 28 is a piece of standard sheet metal.

In the construction shown in Figs. 13 and 14 I have simplified the structure still further by eliminating the short pipe lengths 13a and using only the core 16, strap hinges 58, reinforcing plate 28 and bolts 15. The tailboard is undercut at 68 to clear the reinforcing plate when it is raised to a vertical position.

Having described my invention, I claim:

1. A tail board mounting comprising a tail board member adapted to swing around a tubular hinge member embedded within the rear end of a truck floor and adapted to swing from a vertical position above said floor to a vertical position below said floor, said tail board having an arcuate grooved end which is adapted to move in close relation to an upper right angled corner edge of said floor, and provide a spaceless joint between the tail board and floor members when the upper surface of the tail board is in alignment with the floor surface.

2. A tail board mounting as defined in claim 1 with the hinged portion comprising tubular sections spaced apart and embedded within a groove in the end of the truck floor, a right angled outer edge on each of said tubular sections, and a core within said tubular sections which is adapted to be engaged between the tube spaces by looped ends of straps projecting from and secured to the tail board.

3. A tail board mounting as defined in claim 1 with the hinged portion comprising tubular sections spaced apart and embedded within a groove in the end of the truck floor, a right angled outer edge on each of said tubular sections, and a core within said tubular sections which is adapted to be engaged by eye bolts secured within the end of the tail board.

4. A tail board mounting as defined in claim 1 with the hinged portion comprising flanged tubular sections embedded within a recess in the tail board end in spaced relation, a curved reinforcing end portion welded to said tubular members having a flat top portion coinciding with the floor surface, a core within said tubular members adapted to be engaged by the looped ends of strap members secured to the tail board.

5. A tail board mounting as defined in claim 1 with the hinged portion comprising a substantially square bar having a flanged upper surface, adapted to be secured to the rear end of the truck floor, a plurality of slots within the bar portion and a core within said bar adapted to be engaged by the looped ends of strap members secured to the tail board.

6. A tail board mounting as defined in claim 1 with the hinged portion comprising a substantially channel shaped member having a flanged portion adapted to be secured to the rear end of the truck floor, a rubber composition section inserted within the channel portion and a centrally disposed core within said rubber section adapted to be engaged by the looped ends of strap members secured to the tail board.

7. In a tail board mounting, a stationary hinge member comprising tubular sections, each having one right angled edge, said sections being spaced apart on a core with said right angled edges in alignment, and the whole secured within a recessed end of a truck floor, a reinforcing plate embedded in the truck floor, slots cut in said floor in alignment with sectional tube separations, a pivotal hinge member having a plurality of arms attached thereto which pivotally engage said core member between the spaced tubular members, said pivotal hinge member having an arcuate grooved end adapted to pass over said right angled edge on said tubular sections.

8. In a tail board mounting the combination of a truck floor and a tail board, with a mounting comprising sectional tubular members spaced apart on a core, a recess in the truck floor within which the tubular members are adapted to be secured, and arms attached to the tail board, adapted to pivotally engage the core between the ends of said sectional tubular members.

9. In a tail board mounting, a stationary hinge member, comprising tubular sections mounted in spaced relation upon a core, the whole being secured within a recess in the rear end of a truck floor, said floor having slots in alignment with the sectional tube separations, and a pivotal hinge member having a plurality of arms attached thereto, which arms pivotally engage said core between the spaced tube separations.

10. In a tail board mounting, a stationary hinge member comprising tubular sections mounted in spaced relation upon a core, the whole being secured within a recess in the rear end of a truck floor, a reinforcing plate embedded in the truck floor at the rear end thereof having slots therein and through said floor in alignment with the sectional tube separations, and a pivotal hinge member having a plurality of arms attached thereto, which arms pivotally engage said core between the spaced tubular sections.

DANIEL C. WENDEL.